(12) United States Patent
Yamanaka

(10) Patent No.: US 8,960,037 B2
(45) Date of Patent: Feb. 24, 2015

(54) BALL SCREW DEVICE, LINEAR ACTUATOR AND VEHICLE STEERING SYSTEM

(75) Inventor: Kosuke Yamanaka, Kashihara (JP)

(73) Assignee: JTEKT Corporation, Osaka (JP)

( * ) Notice: Subject to any disclaimer, the term of this patent is extended or adjusted under 35 U.S.C. 154(b) by 97 days.

(21) Appl. No.: 13/877,455

(22) PCT Filed: Sep. 29, 2011

(86) PCT No.: PCT/IB2011/002287
§ 371 (c)(1),
(2), (4) Date: May 16, 2013

(87) PCT Pub. No.: WO2012/046116
PCT Pub. Date: Apr. 12, 2012

(65) Prior Publication Data
US 2013/0239714 A1    Sep. 19, 2013

(30) Foreign Application Priority Data
Oct. 4, 2010    (JP) .................... 2010-225062

(51) Int. Cl.
*F16H 1/24* (2006.01)
*F16H 25/22* (2006.01)
*B62D 5/00* (2006.01)
*B62D 5/04* (2006.01)

(52) U.S. Cl.
CPC ............ *F16H 25/2214* (2013.01); *B62D 5/001* (2013.01); *B62D 5/0448* (2013.01); *F16H 25/2223* (2013.01)
USPC .............. 74/424.81; 74/424.82; 74/424.83; 74/424.84; 74/424.85; 180/402; 180/412; 180/414; 180/415

(58) Field of Classification Search
USPC ......... 180/402, 412, 414, 415, 416, 422, 429, 180/444; 74/388 PS, 424.81, 424.82, 74/424.83, 424.84, 424.85, 424.86
See application file for complete search history.

(56) References Cited

U.S. PATENT DOCUMENTS

| 6,464,034 | B1 | 10/2002 | Toda et al. | |
|---|---|---|---|---|
| 8,418,577 | B2 * | 4/2013 | Asakura et al. | 74/424.81 |
| 2007/0107975 | A1 * | 5/2007 | Onishi et al. | 180/444 |
| 2009/0260468 | A1 * | 10/2009 | Tachikake | 74/424.82 |
| 2010/0051378 | A1 * | 3/2010 | Kurokawa | 180/444 |

(Continued)

FOREIGN PATENT DOCUMENTS

| EP | 1 193 422 A1 | 4/2002 |
|---|---|---|
| JP | U-4-107551 | 9/1992 |
| JP | A-5-306741 | 11/1993 |
| JP | A-11-101324 | 4/1999 |

(Continued)

OTHER PUBLICATIONS

Dec. 3, 2014 Office Action issued in Chinese Application No. 201180048377.9 (with translation).

*Primary Examiner* — Toan To
(74) *Attorney, Agent, or Firm* — Oliff PLC

(57) ABSTRACT

A ball screw device has a plurality of spiral raceways. One end and the other end of each raceway is connected via a bridge. An annular flange of a ball nut has a plurality of mounting portions at equal intervals in a circumferential direction. A fixing screw is fitted to each mounting portion. The bridges arranged so as to overlap with the annular flange in position in an axial direction are arranged at positions different in the circumferential direction from positions at which the mounting portions are arranged, and are arranged at unequal intervals in the circumferential direction.

7 Claims, 5 Drawing Sheets

(56) References Cited

U.S. PATENT DOCUMENTS

| | | | |
|---|---|---|---|
| 2010/0095793 A1* | 4/2010 | Tachikake et al. | 74/424.81 |
| 2012/0080257 A1* | 4/2012 | Lee et al. | 180/443 |
| 2012/0097473 A1* | 4/2012 | Tashiro | 180/444 |
| 2013/0292201 A1* | 11/2013 | Yamanaka | 180/402 |
| 2014/0020492 A1* | 1/2014 | Fujita et al. | 74/422 |
| 2014/0096634 A1* | 4/2014 | Motoyama et al. | 74/424.86 |

FOREIGN PATENT DOCUMENTS

| | | |
|---|---|---|
| JP | A-2000-225956 | 8/2000 |
| JP | A-2001-122138 | 5/2001 |
| JP | A-2002-106672 | 4/2002 |
| JP | A-2004-36789 | 2/2004 |
| JP | A-2006-90436 | 4/2006 |
| JP | A-2007-85502 | 4/2007 |
| WO | WO 2007/126084 A1 | 11/2007 |

* cited by examiner

BALL SCREW DEVICE, LINEAR ACTUATOR AND VEHICLE STEERING SYSTEM

BACKGROUND OF THE INVENTION

1. Field of the Invention

The invention relates to a ball screw device, a linear actuator and a vehicle steering system.

2. Description of Related Art

For example, some of electric power steerings that apply steering assist force to a rack shaft include a ball screw device (for example, see Japanese Patent Application Publication No. 2000-225956 (JP-A-2000-225956), FIG. 6 to FIG. 7C). The ball screw device includes a nut that is rotated by an electric motor. A threaded shaft is inserted through the nut. Balls are arranged between the nut and the threaded shaft. As the nut rotates, the threaded shaft linearly moves in the axial direction. As a result, a tie rod coupled to the threaded shaft is displaced to pivot a knuckle arm to thereby change the direction of a wheel.

In addition, the nut is provided with a circulating member for circulating the balls in the nut. A tube or a bridge is used as the circulating member (for example, see Japanese Patent Application Publication No. 2004-36789 (JP-A-2004-36789), [0016] and FIG. 1, Japanese Patent Application Publication No. 5-306741 (JP-A-5-306741), and FIG. 6, Japanese Utility Model Application Publication No. 4-107551 (JP-U-4-107551), FIG. 6, Japanese Patent Application Publication No. 2001-122138 (JP-A-2001-122138), [0002] and FIG. 5A to FIG. 5C, Japanese Patent Application Publication No. 2007-85502 (JP-A-2007-85502), [0011], FIG. 1 and FIG. 2, and the pamphlet of International Publication No. WO2007/126084, [0074] and FIG. 16).

When the tube is used as the circulating member, the tube projects from the ball nut by a large amount, and the ball screw device radially increases in size. On the other hand, when the bridge formed of a small piece is used as the circulating member, the ball nut may be radially reduced in size. In the case where the bridge is used, a hole is formed in the ball nut, and the bridge is inserted in the hole. In addition, in the ball screw device, or the like, of the electric power steering, a large radial load acts on the ball nut from a road surface via the wheel, the rack shaft, and the like. Therefore, as is described in the pamphlet of International Publication No. WO2007/126084, [0074] and FIG. 16, it is desirable that an annular flange fixed to the outer periphery of the ball nut is used to couple the ball nut to a rotor of the electric motor.

Specifically, the ball nut and the rotor are arranged coaxially with each other, and the annular flange formed on the rotor is matched with the annular flange of the ball nut. Then, bolts are inserted through insertion holes formed in the annular flanges to fix the annular flanges. The plurality of bolts are arranged at equal intervals in the circumferential direction of the annular flanges. When the bridges are fitted to the ball nut as described above and the flanges are fixed around the outer periphery of the ball nut, it is possible to achieve reduction in the size of the ball nut in the radial direction and high load bearing performance. However, in the pamphlet of International Publication No. WO2007/126084, [0074] and FIG. 16, the bridges and the annular flange of the ball nut are arranged so as to deviate from each other in the axial direction, so the ball nut increases in size in the axial direction.

SUMMARY OF THE INVENTION

The invention provides a ball screw device, a linear actuator and a vehicle steering system that are compact and that are able to achieve a high allowable load.

A first aspect of the invention provides a ball screw device. The ball screw device includes: a ball nut that includes a nut body having a female thread groove; a male shaft that has a male thread groove facing the female thread groove; a spiral raceway that is defined between part of the female thread groove and part of the male thread groove; a plurality of balls that are arranged in the raceway; and a bridge that is retained in an insertion hole formed in the ball nut and that is used to circulate the balls from one end of the raceway to the other end of the raceway, wherein a plurality of the raceways and a plurality of the bridges are provided in an axial direction of the male shaft, the ball nut includes an annular flange that is formed on an outer periphery of the nut body, the annular flange has a plurality of mounting portions in a circumferential direction of the annular flange, a predetermined fixing member being fitted to each mounting portion, the plurality of bridges include at least two first bridges that are arranged so as to overlap with the annular flange in position in the axial direction, and the first bridges each are arranged at a position different in the circumferential direction from positions at which the mounting portions are arranged, and are arranged at unequal intervals in the circumferential direction.

According to the first aspect of the invention, the first bridges and the annular flange may be arranged so as to overlap in position in the axial direction. By so doing, the ball screw device may be shortened in the axial direction, so the size of the ball screw device may be reduced. In addition, the bridges are used as circulating members for circulating the balls, so the circulating members are not large in size in the radial direction of the ball nut. Thus, the ball screw device may be shortened in the radial direction, so the size of the ball screw device may be further reduced. Furthermore, the first bridges are arranged at unequal intervals in the circumferential direction. By so doing, the flexibility of layout of arrangement of the fixing members on the annular flange in the circumferential direction may be increased. As a result, the fixing members may be arranged so that the strength of coupling between the annular flange and the fixing members further increases (for example, at equal intervals at a narrow pitch in the circumferential direction). As a result, an allowable value of load (allowable load), such as a radial load, that can be received by the annular flange may be further increased. Thus, it is possible to further increase the allowable load of the ball screw device. In addition, the position of the annular flange and the positions of the first bridges overlap in the axial direction. That is, in the ball nut, the position of the annular flange that serves as an input portion to which force is input and the position of an output portion (female thread groove around the bridges) that outputs force to the balls overlap in the axial direction. By so doing, force that bends or twists the ball nut or the balls may be suppressed, so a load on the balls may be reduced. Accordingly, external force that can be received by the ball screw device may be further increased, so a higher allowable load may be achieved.

In addition, in the first aspect of the invention, the annular flange may be arranged in a middle of the nut body in the axial direction. In this case, it is possible to make it hard for the distribution of a load applied to the ball nut to be biased in the axial direction. By so doing, a load applied to the ball screw device may be reduced, and, as a result, the allowable load of the ball screw device may be further increased.

In addition, in the first aspect of the invention, the plurality of bridges may include a plurality of second bridges that are arranged apart from the annular flange in the axial direction, a first bridge unit formed of the first bridges and a second bridge unit formed of the second bridges that are equal in number to the first bridges of the first bridge unit and that are arranged adjacent to each other in the axial direction may be defined, and the first bridge unit and the second bridge unit may be arranged at equal intervals in the circumferential direction. In this case, when the first bridge unit and the second bridge unit are arranged at equal intervals in the circumferential direction, it is possible to prevent a load from the balls on the ball nut from being biased in the circumferential direction. By so doing, when the ball screw device is driven, variations in load applied to the ball nut may be suppressed, and, as a result, the allowable load of the ball screw device may be further increased.

In addition, a second aspect of the invention provides a linear actuator. The linear actuator includes: the ball screw device; an actuator that includes a rotating member fixed to the annular flange by the fixing members and that is used to rotate the ball nut; and a housing that accommodates the ball nut and that supports the male shaft via a plain bearing so as to be movable in the axial direction. In this case, it is possible to achieve the linear actuator that is compact and that allows the male shaft to receive a large load.

In addition, a third aspect of the invention provides a vehicle steering system. The vehicle steering system includes: the linear actuator; and a linkage member that is coupled to the male shaft of the linear actuator and that is used to steer a steered wheel. In this case, it is possible to achieve the vehicle steering system that is able to receive large force applied from a road surface through the steered wheel, or the like, and that is compact in size.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
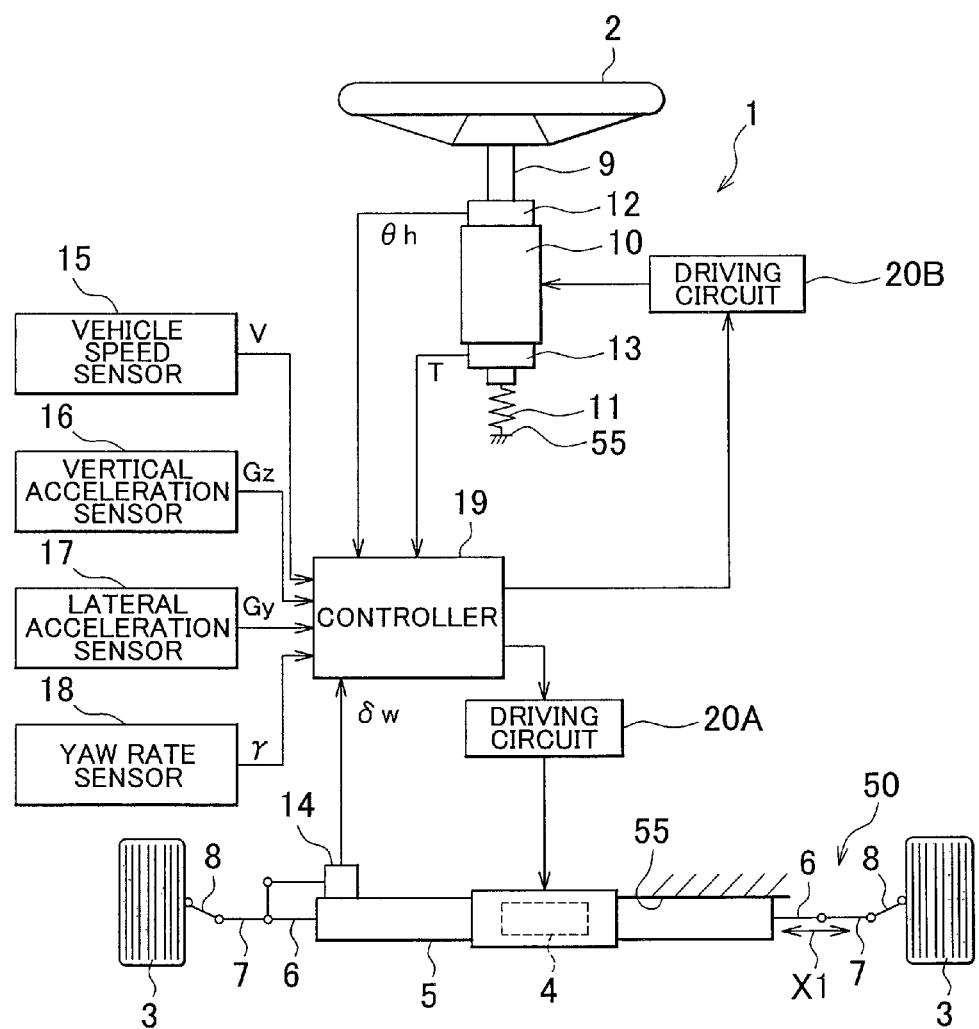
FIG. 1 is a schematic view that shows the schematic configuration of a vehicle steering system according to an embodiment of the invention.

An embodiment of the invention will be described with reference to the accompanying drawings. FIG. 1 is a schematic view that shows the schematic configuration of a vehicle steering system according to an embodiment of the invention. As shown in FIG. 1, the vehicle steering system 1 constitutes a so-called steer-by-wire system in which mechanical coupling between a steering member 2, such as a steering wheel, and steered wheels 3 is eliminated. In the vehicle steering system 1, the motion of a turning actuator 4 is converted to the linear motion of a turning shaft 6 in the vehicle widthwise direction. The turning actuator 4 is driven as the steering member 2 is rotated. The turning actuator 4 serves as a linear actuator, and includes, for example, a brushless electric motor. The turning shaft 6 is supported by a housing 5. The linear motion of the turning shaft 6 is converted to the turning motion of each of the right and left steered wheels 3 for turning the vehicle. By so doing, the vehicle is turned.

The driving force of the turning actuator 4 (the rotational force of an output shaft) is converted to the linear motion of the turning shaft 6 in the axial direction X1 (vehicle widthwise direction) by a motion conversion mechanism (ball screw device) that is provided in association with the turning shaft 6. The linear motion of the turning shaft 6 is transmitted to tie rods 7 that are linkage members coupled to both ends of the turning shaft 6 to thereby pivot knuckle arms 8. By so doing, the steered wheels 3 supported by the knuckle arms 8 are steered.

The turning shaft 6, the tie rods 7, the knuckle arms 8, and the like, constitute a turning mechanism 50 for turning the steered wheels 3. The housing 5 that supports the turning shaft 6, is supported by a vehicle body 55. The steering member 2 is coupled to a rotary shaft 9 that is supported rotatably with respect to the vehicle body. A reaction force actuator 10 is assembled to the rotary shaft 9. The reaction force actuator 10 is used to apply operation reaction force to the steering member 2. The reaction force actuator 10 includes an electric motor, such as a brushless motor, that has an output shaft integrally formed with the rotary shaft 9.

An elastic member 11 formed of, for example, a spiral coil, or the like, is coupled between the vehicle body 55 and an end portion of the rotary shaft 9, opposite to an end portion connected to the steering member 2. The elastic member 11 returns the steering member 2 to a straight steering position by its elastic force when the reaction force actuator 10 is not applying torque to the steering member 2. In order to detect an operation input value of the steering member 2, a steering angle sensor 12 is provided in association with the rotary shaft 9. The steering angle sensor 12 is used to detect the steering angle θh of the steering member 2. In addition, a torque sensor 13 is provided for the rotary shaft 9. The torque sensor 13 is used to detect the steering torque T applied to the steering member 2. On the other hand, a turning angle sensor 14 is provided in association with the turning shaft 6. The turning angle sensor 14 is used to detect the turning angle δw (tire angle) of the steered wheel 3.

Other than these sensors, a vehicle speed sensor 15, a vertical acceleration sensor 16, a lateral acceleration sensor 17 and a yaw rate sensor 18 are provided. The vehicle speed sensor 15 detects the vehicle speed, V. The vertical acceleration sensor 16 serves as a bad road condition detecting sensor, and detects the vertical acceleration Gz of the vehicle body 55. The lateral acceleration sensor 17 detects the lateral acceleration Gy of the vehicle. The yaw rate sensor 18 detects the yaw rate γ of the vehicle. Signals detected by the above sensors 12 to 18 are input to a controller 19. The controller 19 serves as a vehicle control unit and is formed of an electronic control unit (ECU) that is configured to include a microcomputer.

The controller 19 sets a target turning angle on the basis of the steering angle θh detected by the steering angle sensor 12 and the vehicle speed V detected by the vehicle speed sensor 15. Then, the controller 19 executes drive control (turning control) over the turning actuator 4 via a driving circuit 20A on the basis of the target turning angle and the turning angle δw detected by the turning angle sensor 14. On the other hand, the controller 19 executes drive control (reaction force control) over the reaction force actuator 10 via a driving circuit 20B on the basis of the detected signals output from the sensors 12 to 18 so as to generate appropriate reaction force in a direction opposite to the steering direction of the steering member 2.

Figure 2:
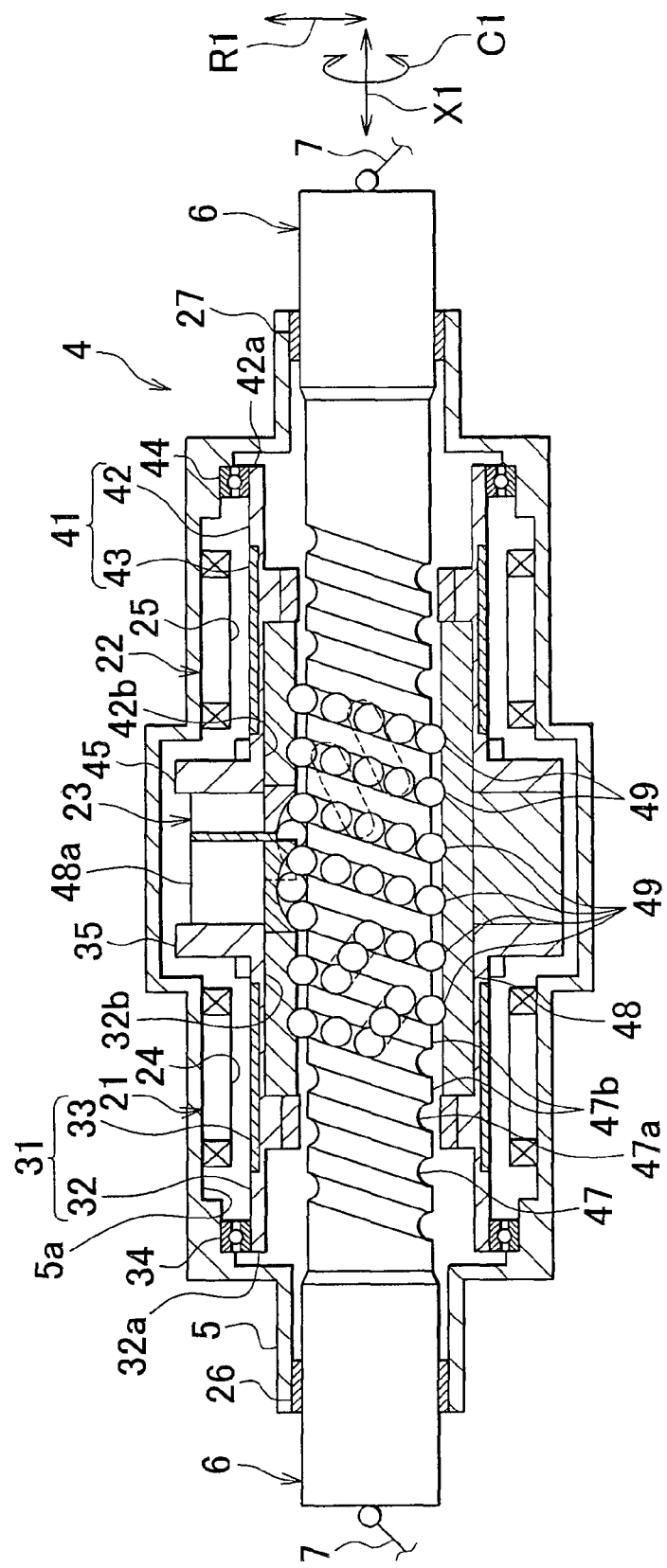
FIG. 2 is a partially sectional view of a major portion around a turning actuator.

FIG. 2 is a partially sectional view of a major portion around the turning actuator 4. As shown in FIG. 2, the middle portion of the turning shaft 6 is inserted in the cylindrical housing 5. Both end portions of the housing 5 support the turning shaft 6 via cylindrical bushings 26 and 27 so as to be slidable in the axial direction X1. The cylindrical bushings 26 and 27 serve as plain bearings. The turning actuator 4 displaces the tie rods 7 in the transverse direction of the vehicle to thereby change the direction of the steered wheels 3. Part of the turning actuator 4 is arranged in the housing 5. The turning actuator 4 includes the housing 5, a first electric motor 21, a second electric motor 22 and a ball screw device 23. The first electric motor 21 and the second electric motor serve as actuators. The ball screw device 23 is driven by these motors 21 and 22.

The first electric motor 21 and the second electric motor 22 have a symmetrical shape in the axial direction X1 of the turning shaft 6. The first electric motor 21 and the second electric motor 22 are arranged in the axial direction X1 inside the housing 5. The first electric motor 21 includes a first stator 24 that is fixed to an inner peripheral surface 5a of the housing 5. The second electric motor 22 includes a second stator 25 that is fixed to the inner peripheral surface 5a of the housing 5.

In addition, the first electric motor 21 includes a first rotor 31 that surrounds the turning shaft 6. The first rotor 31 serves as a rotating member. The first rotor 31 includes a first rotor core 32 and an annular first magnet 33. The first magnet 33 is coupled to the first rotor core 32 so as to be integrally rotatable. The first rotor core 32 is formed in a cylindrical shape. The outer peripheral surface of one end portion 32a of the first rotor core 32 is rotatably supported by the inner peripheral surface 5a of the housing 5 via a first rolling bearing 34. A first annular flange 35 is formed at the other end portion 32b of the first rotor core 32. The first annular flange 35 is formed in an annular shape.

The first magnet 33 has an outer peripheral surface having alternately different N poles and S poles in the circumferential direction. C1 of the turning shaft 6. The first magnet 33 is fixed to the outer peripheral surface of the first rotor core 32. The first magnet 33 is surrounded by the first stator 24. In addition, the second electric motor 22 includes a second rotor 41 that surrounds the turning shaft 6. The second rotor 41 serves as a rotating member. The second rotor 41 includes a second rotor core 42 and an annular second magnet 43. The second magnet 43 is coupled to the second rotor core 42 so as to be integrally rotatable. The second rotor core 42 is formed in a cylindrical shape. The outer peripheral surface of one end portion 42a of the second rotor core 42 is rotatably supported by the inner peripheral surface 5a of the housing 5 via a second rolling bearing 44. A second annular flange 45 is formed at the other end portion 42b of the second rotor core 42. The second annular flange 45 is formed in an annular shape.

The second magnet 43 has an outer peripheral surface having alternately different N poles and S poles in the circumferential direction C1 of the turning shaft 6. The second magnet 43 is fixed to the outer peripheral surface of the second rotor core 42. The second magnet 43 is surrounded by the second stator 25. The first rotor 31 and the second rotor 41 are coupled to each other via an annular flange 48c (described later) of the ball screw device 23 so as to be integrally rotatable, and rotate in the same direction.

Axial movement of the outer ring of each of the first bearing 34 and the second bearing 44 with respect to the housing 5 is restricted. In addition, axial movement of the inner ring of each of the first bearing 34 and the second bearing 44 with respect to a corresponding one of the rotor cores 32 and 42 is restricted. By so doing, axial movement of each of the first rotor 31 and the second rotor 41 with respect to the housing 5 is restricted. The ball screw device 23 is provided as the motion conversion mechanism that converts the output rotation of each of the electric motors 21 and 22 to the axial movement of the turning shaft 6.

The ball screw device 23 includes the turning shaft 6, a ball nut 48 and a large number of balls 49. The turning shaft 6 includes a threaded shaft 47, and serves as a male shaft. The ball nut 48 surrounds the threaded shaft 47, and is integrally rotatable with the first rotor 31 and the second rotor 41. The balls 49 form a train of balls. The ball nut 48 is accommodated in the housing 5. The threaded shaft 47 is formed in part of the turning shaft 6. A spiral male thread groove 47a and a cylindrical land portion 47b are formed on the outer periphery of the threaded shaft 47. The land portion 47b is continuous in a spiral shape.

Figure 3:
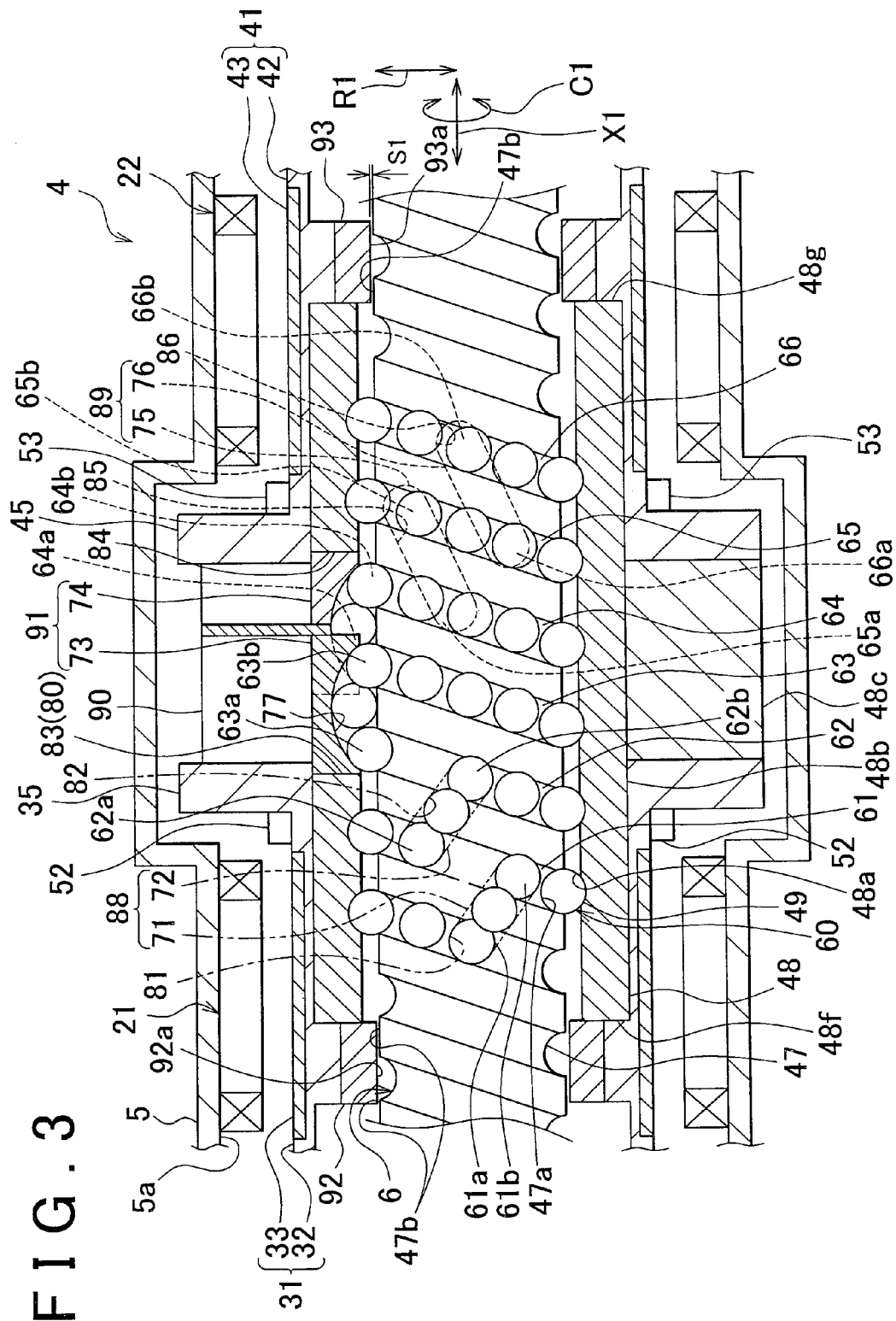
FIG. 3 is an enlarged view of the major portion shown in FIG. 2.
Figure 4:
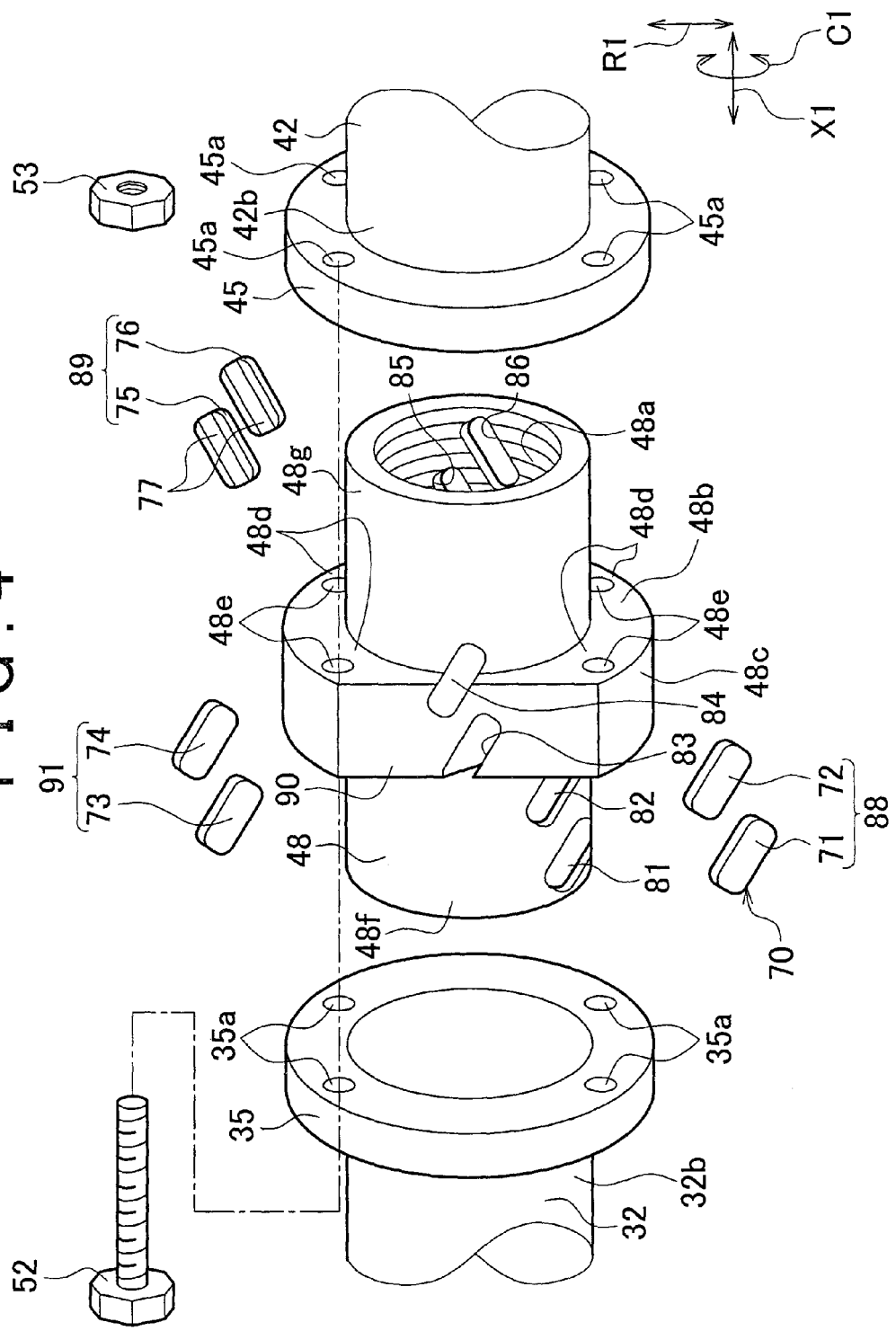
FIG. 4 is an exploded perspective view of members around a ball nut.

FIG. 3 is an enlarged view of a major portion of FIG. 2. FIG. 4 is an exploded perspective view of members around the ball nut 48. As shown in FIG. 3 and FIG. 4, the ball nut 48 includes a cylindrical nut body 48b and an annular flange 48c. The nut body 48b has a spiral female thread groove 48a. The annular flange 48c projects from the outer peripheral surface of the nut body 48b outward in the radial direction of the ball nut 48. The nut body 48b and the annular flange 48c are integrally formed by welding, or the like.

The female thread groove 48a is formed on the inner periphery of the nut body 48b. The female thread groove 48a is, for example, formed all over the nut body 48b in the axial direction X1, and surrounds the male thread groove 47a of the threaded shaft 47. The balls 49 are interposed between the female thread groove 48a of the ball nut 48 and the male thread groove 47a of the threaded shaft 47. The annular flange 48c is arranged, for example, in the middle of the nut body 48b in the axial direction X1. A plurality of (four in the present embodiment) mounting portions 48d are formed in the annular flange 48c at equiangular positions in the circumferential direction C1 (the circumferential direction of the annular flange 48c). Fixing screws 52 that serve as fixing members are fitted to the mounting portions 48d.

Each mounting portion 48d has an insertion hole 48e for inserting a corresponding one of the threaded shafts of the fixing screws 52. In addition, the first annular flange 35 of the first electric motor 21 is matched with the annular flange 48c, and has insertion holes 35a at positions respectively facing the insertion holes 48e. Similarly, the second annular flange 45 of the second electric motor 22 is matched with the annular flange 48c, and has insertion holes 45a at positions respectively facing the insertion holes 48e.

The number of the fixing screws 52 and the number of fixing nuts 53 are equal to the number of the mounting portions 48d (in FIG. 4, only one fixing screw 52 and only one fixing nut 53 are shown). The threaded shaft of each fixing screw 52 is inserted through the corresponding insertion holes 35a, 48e and 45a and is screwed to the corresponding fixing nut 53. By so doing, the first rotor 31 of the first electric motor 21, the annular flange 48c of the ball nut 48 and the second rotor 41 of the second electric motor 22 are fixed to one another, and are integrally rotatable. The nut body 48b of the ball nut 48 is surrounded by the first rotor 31 and the second rotor 41.

As shown in FIG. 3, the female thread groove 48a of the ball nut 48 and the male thread groove 47a of the threaded shaft 47 face each other in the radial direction R1 of the turning shaft 6. A plurality of (six in the present embodiment) spiral raceways 61 to 66 are defined by part of the female thread groove 48a of the ball nut 48 and part of the male thread groove 47a of the threaded shaft 47. The first raceway 61, the second raceway 62, the third raceway 63, the fourth raceway 64, the fifth raceway 65 and the sixth raceway 66 are arranged side by side in order from the left side of FIG. 3 in the axial direction X1. Each of the raceways 61 to 66 has substantially the same overall length. A plurality of the balls 49 are arranged in each of the raceways 61 to 66. Note that, when the raceways 61 to 66 are collectively termed, they are simply referred to as raceways 60. Each of the raceways 60 extends spirally so as to go substantially around the threaded shaft 47.

As shown in FIG. 3 and FIG. 4, bridges 71 to 76 are fitted to the ball nut 48. Each of the bridges 71 to 76 is used to circulate the balls 49 from one end to the other end of a corresponding one of the raceways 61 to 66. The bridges 73 and 74 are provided as first bridges (predetermined bridges), and the bridges 71, 72, 75 and 76 are provided as second bridges. Note that, when the bridges 71 to 76 are collectively termed, they are simply referred to as bridges 70.

Each of the bridges 70 is formed in a long small piece. Each of the bridges 70 has a recessed groove 77 that extends in the longitudinal direction of the bridge 70. Each recessed groove 77 is formed so that the depth at each end portion in the longitudinal direction of the bridge 70 is shallow and the depth of the middle portion in the longitudinal direction is deep. By so doing, each of the bridges 70 fitted to the nut body 48b uses the recessed groove 77 to connect one end and the other end of a corresponding one of the raceways 60. The balls 49 at one end of each raceway 60 are allowed to move to the other end of the raceway 60 through the recessed groove 77 of a corresponding one of the bridges 70. Similarly, the balls 49 at the other end of each raceway 60 are allowed to move to one end of the raceway 60 through the recessed groove 77 of the corresponding bridge 70.

The bridge 71 is arranged near one end portion 48f of the nut body 48b. The bridge 71 is fitted to an insertion hole 81 formed through the nut body 48b, and is fixed to the ball nut 48 by welding, or the like. The bridge 71 connects one end 61a and the other end 61b of the raceway 61. The bridge 72 is arranged near the one end portion 48f of the nut body 48b, and is arranged adjacent to the bridge 71 in the axial direction X1. The bridge 72 is fitted to an insertion hole 82 formed through the nut body 48b, and is fixed to the ball nut 48 by welding, or the like. The bridge 72 connects one end 62a and the other end 62b of the raceway 62.

Figure 5:
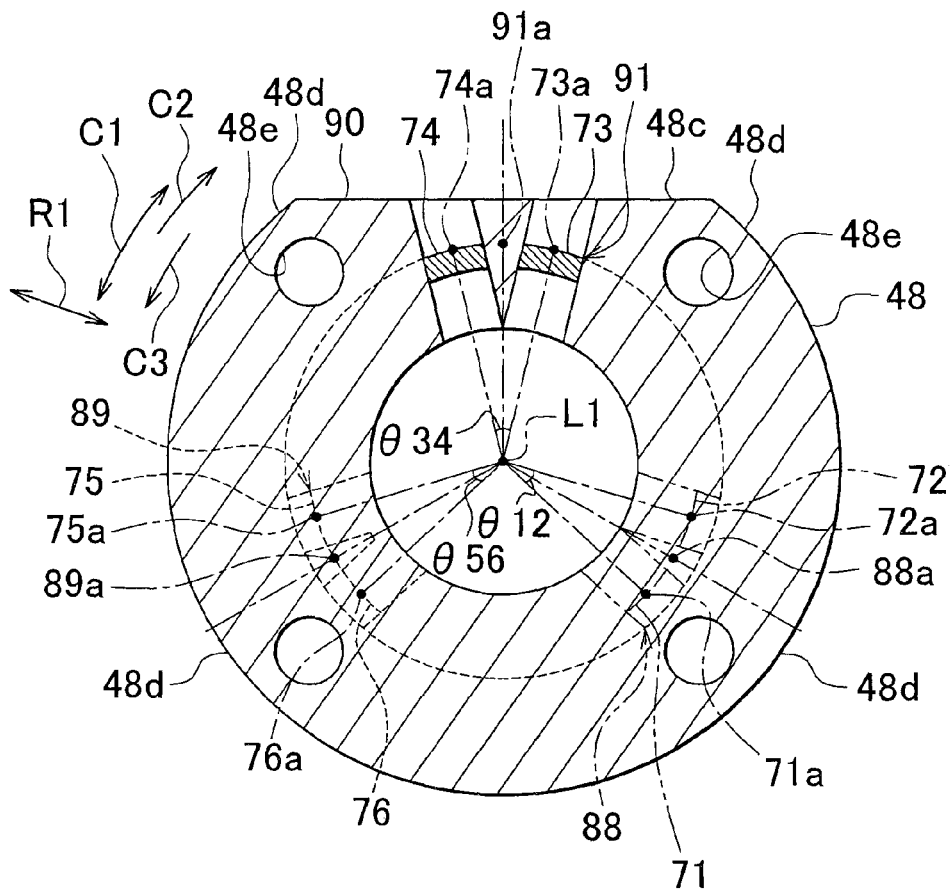
FIG. 5 is a sectional view of the ball nut, taken along a plane perpendicular to the axis of the ball nut, and that shows arrangement of bridges.

FIG. 5 is a sectional view of the ball nut 48, taken along a plane perpendicular to the axis of the ball nut 48, and that shows arrangement of the bridges 71 to 76. As shown in FIG. 5, the bridge 72 and the bridge 71 are arranged at unequal intervals in the circumferential direction C1. More specifically, the distance from the center 71a of the bridge 71 to the center 72a of the bridge 72 in the circumferential direction C1 is different between when measured toward one side C2 in the circumferential direction C1 and when measured toward the other side C3 in the circumferential direction C1.

In other words, the angle from the center 71a of the bridge 71 to the center 72a of the bridge 72 about the central axis L1 of the ball nut 48 is different between when measured toward one side C2 in the circumferential direction C1 and when measured toward the other side C3 in the circumferential direction C1. In this way, the bridge 71 and the bridge 72 are arranged so as to be biased in the circumferential direction C1, and are located adjacent to each other in the circumferential direction C1. When viewed in the axial direction X1, the narrow angle θ12 made between the line segment that connects the center 71a of the bridge 71 to the central axis L1 of the ball nut 48 and the line segment that connects the central axis L1 to the center 72a of the bridge 72 is about several tens of degrees (for example, 30 degrees) and is smaller than or equal to 45 degrees.

As shown in FIG. 3 and FIG. 4, the bridge 71 and the bridge 72 that are arranged on one side in the axial direction X1 apart from the annular flange 48c form a second bridge unit 88. The bridge 75 is arranged near the other end portion 48g of the nut body 48b. The bridge 75 is fitted to an insertion hole 85 formed through the nut body 48b, and is fixed to the ball nut 48 by welding, or the like. The bridge 75 connects one end 65a and the other end 65b of the raceway 65.

The bridge 76 is arranged near the other end portion 48g of the nut body 48b, and is arranged adjacent to the bridge 75 in the axial direction X1. The bridge 76 is fitted to an insertion hole 86 formed through the nut body 48b, and is fixed to the ball nut 48 by welding, or the like. The bridge 76 connects one end 66a and the other end 66b of the raceway 66. As shown in FIG. 5, the bridge 76 and the bridge 75 are arranged at unequal intervals in the circumferential direction C1. More specifically, the distance from the center 75a of the bridge 75 to the center 76a of the bridge 76 in the circumferential direction C1 is different between when measured toward one side C2 in the circumferential direction C1 and when measured toward the other side C3 in the circumferential direction C1.

In other words, the angle from the center 75a of the bridge 75 to the center 76a of the bridge 76 about the central axis L1 of the ball nut 48 is different between when measured toward one side C2 in the circumferential direction C1 and when measured toward the other side C3 in the circumferential direction C1. In this way, the bridge 75 and the bridge 76 are arranged so as to be biased in the circumferential direction C1, and are located adjacent to each other in the circumferential direction C1. When viewed in the axial direction X1, the narrow angle θ56 made between the line segment that connects the center 75a of the bridge 75 to the central axis L1 of the ball nut 48 and the line segment that connects the central axis L1 to the center 76a of the bridge 76 is about several tens of degrees (for example, 30 degrees) and is smaller than or equal to 45 degrees.

As shown in FIG. 3 and FIG. 4, the bridge 75 and the bridge 76 that are arranged on the other side in the axial direction X1 apart from the annular flange 48c form a second bridge unit 89. The bridge 73 is arranged in the middle portion of the nut body 48b. The bridge 73 is fitted to an insertion hole 83 formed through the annular flange 48c and the nut body 48b, and is fixed to the ball nut 48 by welding, or the like. The bridge 73 connects one end 63a and the other end 63b of the raceway 63.

The insertion hole 83 is formed in a shape that allows the bridge 73 to be inserted, and is formed by cutting out part of the annular flange 48c. In addition, the insertion hole 83 is open to a partially cut-out flat cutout portion 90 of the outer peripheral surface of the annular flange 48c, and is open to one side in the axial direction X1. The bridge 73 is inserted in the insertion hole 83 in the radial direction R1. With the above configuration, the bridge 73 and the annular flange 48c overlap in position in the axial direction X1. In addition, the raceway 63 and the annular flange 48c overlap in position in the axial direction X1.

The bridge 74 is arranged in the middle portion of the nut body 48b. The bridge 74 is fitted to an insertion hole 84 formed through the annular flange 48c and the nut body 48b, and is fixed to the ball nut 48 by welding, or the like. The bridge 74 connects one end 64a and the other end 64b of the raceway 64. The insertion hole 84 is formed in a shape that allows the bridge 74 to be inserted, and is formed by cutting out part of the annular flange 48c. In addition, the insertion hole 84 is open to the cutout portion 90 of the outer peripheral surface of the annular flange 48c, and is open to the other side in the axial direction X1. The bridge 74 is inserted in the insertion hole 84 in the radial direction R1. With the above configuration, the bridge 74 and the annular flange 48c overlap in position in the axial direction X1. In addition, the raceway 64 and the annular flange 48c overlap in position in the axial direction X1. The bridge 73 and the bridge 74 are arranged adjacent to each other in the axial direction X1.

As shown in FIG. 5, the bridge 73 and the bridge 74 are arranged at unequal intervals in the circumferential direction C1. More specifically, the distance from the center 73a of the bridge 73 to the center 74a of the bridge 74 in the circumferential direction C1 is different between when measured toward one side C2 in the circumferential direction C1 and when measured toward the other side C3 in the circumferential direction C1. In other words, the angle from the center 73a of the bridge 73 to the center 74a of the bridge 74 about the central axis L1 of the ball nut 48 is different between when measured toward one side C2 in the circumferential direction C1 and when measured toward the other side C3 in the circumferential direction C1.

In this way, the bridge 73 and the bridge 74 are arranged so as to be biased in the circumferential direction C1, and are located adjacent to each other in the circumferential direction C1. When viewed in the axial direction X1, the narrow angle $\theta 34$ made between the line segment that connects the center 73a of the bridge 73 to the central axis L1 of the ball nut 48 and the line segment that connects the central axis L1 to the center 74a of the bridge 74 is about several tens of degrees (for example, 30 degrees) and is smaller than or equal to 45 degrees. In the present embodiment, the narrow angle $\theta 12$=the narrow angle $\theta 34$=the narrow angle $\theta 56$. Note that one of the narrow angles $\theta 12$, $\theta 34$ and $\theta 56$ may be different from the others.

The bridge 73 and the bridge 74 are arranged between the mounting portions 48d that are located adjacent to each other in the circumferential direction C1 of the annular flange 48c, and are arranged at positions different in the circumferential direction C1 from the positions at which the mounting portions 48d are arranged. The bridge 73 and the bridge 74 that overlap with the annular flange 48c in position in the axial direction X1 form a first bridge unit 91.

The number of the bridges 73 and 74 of the first bridge unit 91, the number of the bridges 71 and 72 of the second bridge unit 88 and the number of the bridges 75 and 76 of the second bridge unit 89 each are two and are equal to one another. When viewed in the axial direction X1, the first bridge unit 91, the second bridge unit 88 and the second bridge unit 89 are arranged at equal intervals in the circumferential direction C1. Specifically, the center 91a of the first bridge unit 91, the center 88a of the second bridge unit 88 and the center 89a of the second bridge unit 89 are arranged at equal intervals, that is, at an interval of 120 degrees, in the circumferential direction C1.

As shown in FIG. 3, as described above, axial movement of the ball nut 48 with respect to the first rotor 31 and the second rotor 41 is restricted. In addition, axial movement of the first rotor 31 and the second rotor 41 with respect to the housing 5 is restricted via the first and second bearings 34 and 44. Thus, axial movement of the ball nut 48 with respect to the housing 5 is restricted.

Cylindrical first and second bushings 92 and 93 are respectively fitted to the inner peripheral surface of the first rotor core 32 and the inner peripheral surface of the second rotor core 42 on both sides of the ball nut 48 in the axial direction X1 so as to be integrally rotatable. A first radial gap S1 is provided between the inner peripheral surface 92a of the bushing 92 and the threaded shaft 47 and between the inner peripheral surface 93a of the bushing 93, more specifically, between the inner peripheral surface 92a, of the bushing 92 and the cylindrical land portion 47 of the outer periphery of the threaded shaft 47 and between the inner peripheral surface 93a of the bushing 93 and the cylindrical land portion 47 of the outer periphery of the threaded shaft 47.

Figure 6:
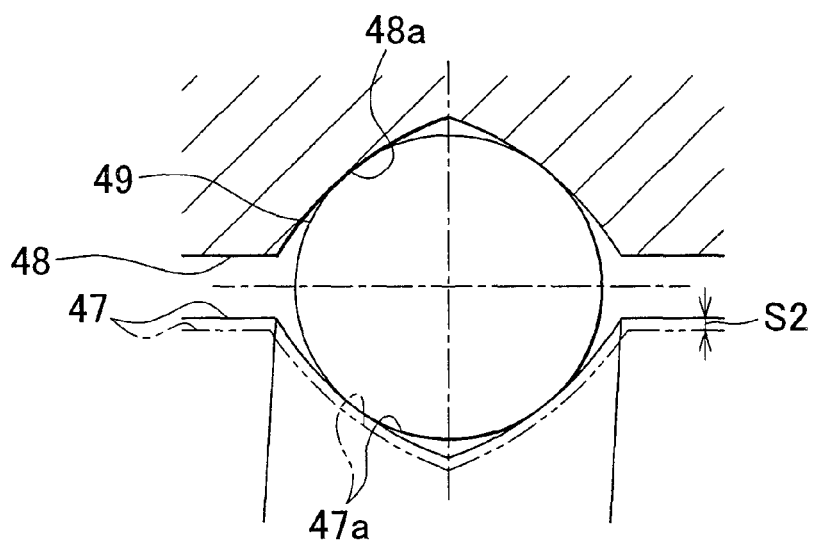
FIG. 6 is an enlarged view around a raceway.

FIG. 6 is an enlarged view around the raceway 60. As shown in FIG. 6, a second radial gap S2 is formed between the ball 49 and the male thread groove 47a of the threaded shaft 47 in order to smoothly rotate the ball nut 48 with respect to the threaded shaft 47. Note that, in FIG. 6, the sectional shape of each of the thread grooves 47a and 48a is formed in a Gothic arch shape that is formed of two circular arcs; however, the sectional shape is not limited to the Gothic arch shape.

As shown in FIG. 3 and FIG. 6, the first radial gap S1 is smaller than the second radial gap S2 (corresponding to the amount of play of each ball 49) between the ball 49 and the male thread groove 47a. The ball nut 48 and the bushings 92 and 93 are retained by the inner peripheral surfaces of the rotor cores 32 and 42, so it is possible to accurately set the positional relationship between the ball nut 48 and the bushings 92 and 93. Thus, the first radial gap S1 may be set so as to be substantially smaller than the second radial gap S2 (S1<S2).

As described above, according to the present embodiment, the bridges 73 and 74 of the first bridge unit 91 and the annular flange 48c may be arranged so as to overlap in position in the axial direction X1. By so doing, the ball screw device 23 may be shortened in the axial direction X1, so the size of the ball screw device 23 may be reduced. In addition, the bridges 70 are used as the circulating members for circulating the balls 49, so the circulating members are not large in size in the radial direction R1 of the ball nut 48. Thus, the ball screw device 23 may be shortened in the radial direction R1, so the size of the ball screw device 23 may be further reduced.

Furthermore, the bridges 73 and 74 of the first bridge unit 91 are arranged at unequal intervals in the circumferential direction C1. By so doing, the flexibility of layout of arrangement of the fixing screws 52 and the fixing nuts 53 on the annular flange 48c in the circumferential direction C1 may be increased. As a result, the fixing screws 52 may be arranged so that the strength of coupling between the annular flange 48c and the fixing screws 52 further increases (for example, at equal intervals at a narrow pitch in the circumferential direction C1). As a result, an allowable value of load (allowable load), such as a radial load, that can be received by the annular flange 48c may be further increased.

Thus, it is possible to further increase the allowable load of the ball screw device 23. In addition, the position of the annular flange 48c and the positions, of the bridges 73 and 74 overlap in the axial direction X1. That is, in the ball nut 48, the position of the annular flange 48c that serves as an input portion to which force is input and the position of an output portion (female thread groove 48a around the bridges 73 and 74) that outputs force to the balls 49 overlap in the axial direction X1. By so doing, force that bends or twists the ball nut 48 or the balls 49 may be suppressed, so a load on the balls 49 may be reduced. Accordingly, external force that can be received by the ball screw device 23 may be further increased, so a higher allowable load may be achieved.

In addition, by reducing the size of the turning actuator 4, it is possible to achieve weight reduction, energy saving and cost reduction of the turning actuator 4. Furthermore, the annular flange 48c is arranged in the middle of the nut body 48b in the axial direction X1. By so doing, it is possible to make it hard for the distribution of a load applied to the ball nut 48 to be biased in the axial direction X1. By so doing, a load applied to the ball screw device 23 may be reduced, and, as a result, the allowable load of the ball screw device 23 may be further increased.

In addition, the first bridge unit 91, the second bridge unit 88 and the second bridge unit 89 are arranged at equal intervals in the circumferential direction C1. In this way, when the first bridge unit 91 and the second bridge units 88 and 89 are arranged at equal intervals in the circumferential direction C1, it is possible to prevent a load from the balls 49 on the ball nut 48 from being biased in the circumferential direction C1. By so doing, when the ball screw device 23 is driven, variations in load applied to the ball nut 48 may be suppressed, and, as a result, the allowable load of the ball screw device 23 may be further increased.

As described above, it is possible to achieve the turning actuator 4 that is easily mounted on the vehicle body 55 because of its compactness and of which the turning shaft 6 is able to receive a large load. That is, it is possible to achieve the vehicle steering system 1 that is able to receive large force applied from a road surface through the steered wheels 3, or the like, and that is compact in size. In addition, the first radial gap S1 is smaller than the second radial gap S2. As a result, a radial load that is applied to the threaded shaft 47 because of road surface input, or the like, may be reliably received by the inner peripheral surface 92a of the first bushing 92 and the inner peripheral surface 93a of the second bushing 93. By so doing, it is possible to remarkably reduce a radial load applied to the ball nut 48. As a result, fretting wear, or the like, of the raceway surfaces of the thread grooves 47a and 48a may be prevented, so the durability may be improved. In addition, such an excellent advantageous effect may be exercised by adding the first and second bushings 92 and 93 around the rotors 31 and 41, so it is possible to achieve the compact and low-cost vehicle steering system 1.

In addition, as shown in FIG. 3, each of the bushings 92 and 93 has an axial length such that each of the inner peripheral surfaces 92a and 93a of the bushings 92 and 93 at least faces two circles of the land portion 47b of the threaded shaft 47. By so doing, it is possible to ensure a sufficient contact area between the land portion 47b and each of the bushings 92 and 93. As a result, a radial load from the threaded shaft 47 may be reliably received by the bushings 92 and 93.

Note that the inner peripheral surface 92a of the bushing 92 and the inner peripheral surface 93a of the bushing 93 are desirably finished, for example, with respect to the outer peripheral surfaces of the corresponding rotor cores 32 and 42 in a state where the bushings 92 and 93 are fitted to the inner peripheral surfaces of the corresponding rotor cores 32 and 42. In this case, the inner peripheral surfaces 92a and 93a of the bushings 92 and 93, respectively fitted to the rotor cores 32 and 42, are machined with respect to the outer peripheral surfaces of the rotor cores 32 and 42, so it is possible to accurately set the positional relationship between the ball nut 48 and the inner peripheral surfaces 92a and 93a of the bushings 92 and 93, all of which are retained by the rotor cores 32 and 42. By extension, the first radial gap S1 may be accurately set so as to be smaller than the second radial gap S2.

Furthermore, it is desirable that, in a state where a manufacturing intermediate product of a ball nut is fitted to the inner peripheral surfaces of the rotor cores 32 and 42, the female thread groove 48a is machined on the inner periphery of the cylindrical manufacturing intermediate product with respect to the outer peripheral surfaces of the rotor cores 32 and 42. In this case, the female thread groove 48a of the ball nut 48 and the inner peripheral surfaces 92a and 93a of the bushings 92 and 93 are machined with respect to the same reference surfaces (the outer peripheral surfaces of the rotor cores 32 and 42), so the first radial gap S1 between each of the bushings 92 and 93 and the threaded shaft 47 may be further accurately set.

The aspect of the invention is not limited to the details of the above described embodiment; it may be modified in various forms within the scope of the appended claims. For example, the number of bridges of the first bridge unit 91 may be three or more. In addition, the bridges 71 and 72 of the second bridge unit 88 may be arranged at equal intervals (at an interval of 180 degrees) in the circumferential direction C1. Similarly, the bridges 74 and 75 of the second bridge unit 89 may be arranged at equal intervals (at an interval of 180 degrees) in the circumferential direction C1.

In addition, the ball screw device according to the aspect of the invention may be applied to a ball screw device equipped for a system other than the vehicle steering system.

What is claimed is:

1. A ball screw device comprising:
   a ball nut that includes a nut body having a female thread groove;
   a male shaft that has a male thread groove facing the female thread groove;
   a spiral raceway that is defined between part of the female thread groove and part of the male thread groove;
   a plurality of balls that are arranged in the raceway; and
   a bridge that is retained in an insertion hole formed in the ball nut and that is used to circulate the balls from one end of the raceway to the other end of the raceway, wherein
   a plurality of the raceways and a plurality of the bridges are provided in an axial direction of the male shaft,
   the ball nut includes an annular flange that is formed on an outer periphery of the nut body,
   the annular flange has a plurality of mounting portions in a circumferential direction of the annular flange, a predetermined fixing member being fitted to each mounting portion,
   the plurality of bridges include at least two first bridges that are arranged so as to overlap with the annular flange in position in the axial direction, and
   the first bridges each are arranged at a position different in the circumferential direction from positions at which the mounting portions are arranged, and are arranged at unequal intervals in the circumferential direction.

2. The ball screw device according to claim 1, wherein the annular flange is arranged in a middle of the nut body in the axial direction.

3. The ball screw device according to claim 1, wherein
   the plurality of bridges include a plurality of second bridges that are arranged apart from the annular flange in the axial direction,
   a first bridge unit formed of the first bridges and a second bridge unit formed of the second bridges that are equal in number to the first bridges of the first bridge unit and that are arranged adjacent to each other in the axial direction are defined, and
   the first bridge unit and the second bridge unit are arranged at equal intervals in the circumferential direction.

4. The ball screw device according to claim 3, wherein a distance in the circumferential direction between the second bridges that are arranged adjacent to each other in the axial direction is equal to a distance in the circumferential direction between the first bridges.

5. A linear actuator comprising:
the ball screw device according to claim 1;
an actuator that includes a rotating member fixed to the annular flange by the fixing members and that is used to rotate the ball nut; and
a housing that accommodates the ball nut and that supports the male shaft via a plain bearing so as to be movable in the axial direction.

6. The linear actuator according to claim 5, further comprising:
a bushing that is provided between the rotating member and the male shaft, wherein
a first radial gap between the bushing and an outer peripheral surface of the male shaft is smaller than a second radial gap between each of the balls and the male thread groove.

7. A vehicle steering system comprising:
the linear actuator according to claim 5; and
a linkage member that is coupled to the male shaft of the linear actuator and that is used to steer a steered wheel.

* * * * *